No. 785,211. PATENTED MAR. 21, 1905.
E. W. HARTOUGH.
DRAFT RIGGING.
APPLICATION FILED NOV. 23, 1903.

4 SHEETS—SHEET 1.

Witnesses:
A. W. Arthur
P. A. Hickey

Inventor:
Edward W. Hartough
By F. G. Fischer
Atty.

No. 785,211. PATENTED MAR. 21, 1905.
E. W. HARTOUGH.
DRAFT RIGGING.
APPLICATION FILED NOV. 23, 1903.

4 SHEETS—SHEET 2.

Witnesses:
A. McArthur
T. A. Hickey

Inventor:
Edward W. Hartough
By F. G. Fischer
Atty

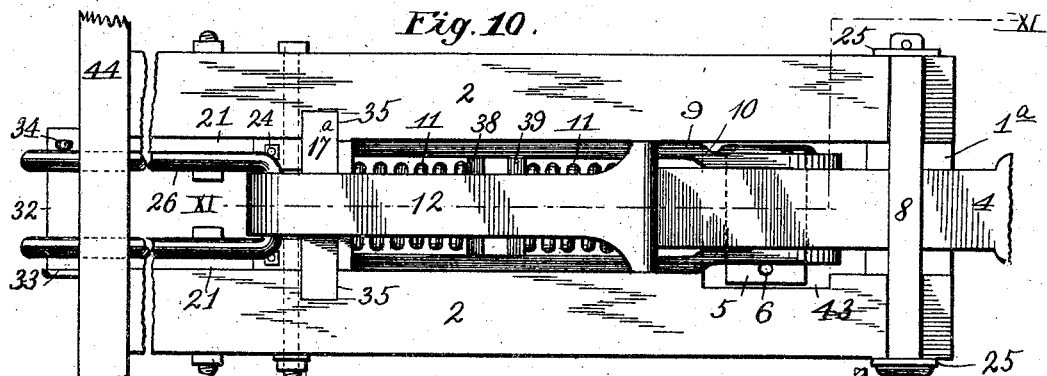
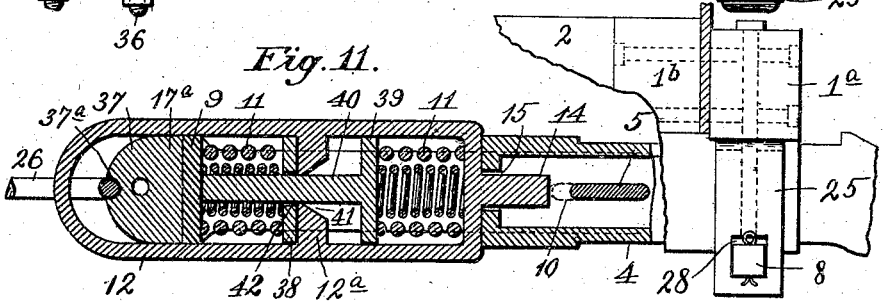
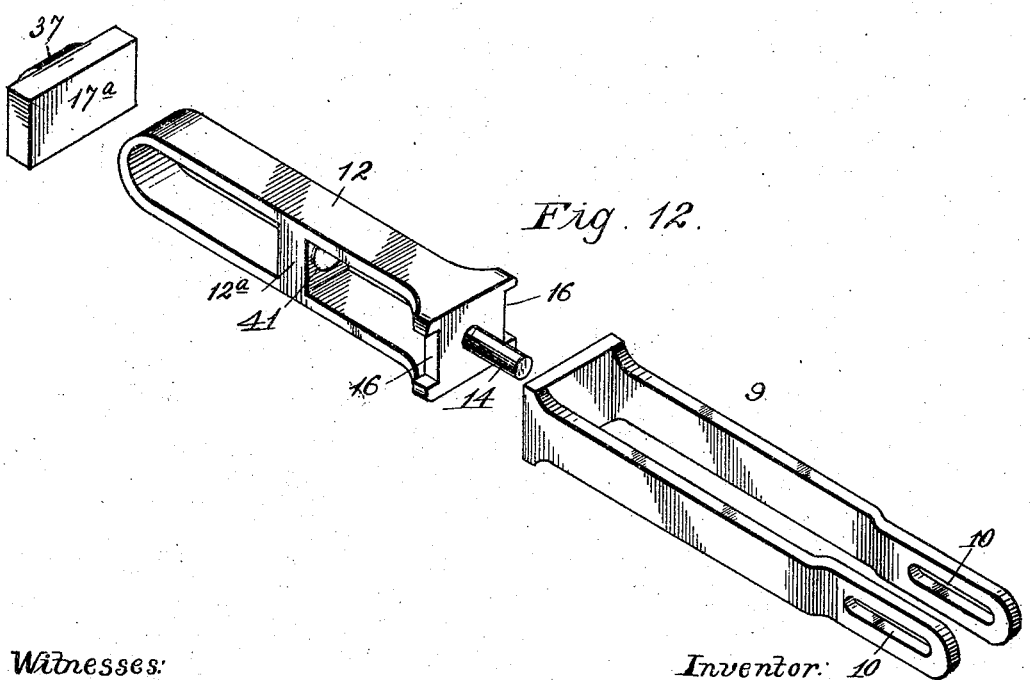

No. 785,211. PATENTED MAR. 21, 1905.
E. W. HARTOUGH.
DRAFT RIGGING.
APPLICATION FILED NOV. 23, 1903.
4 SHEETS—SHEET 4.
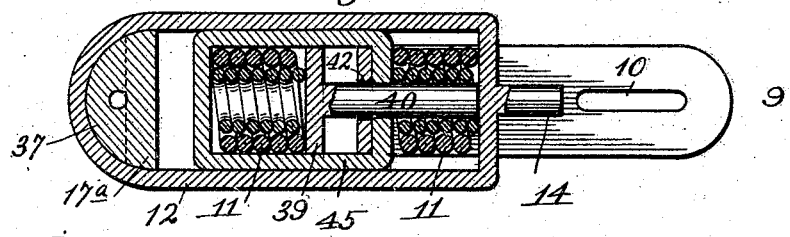
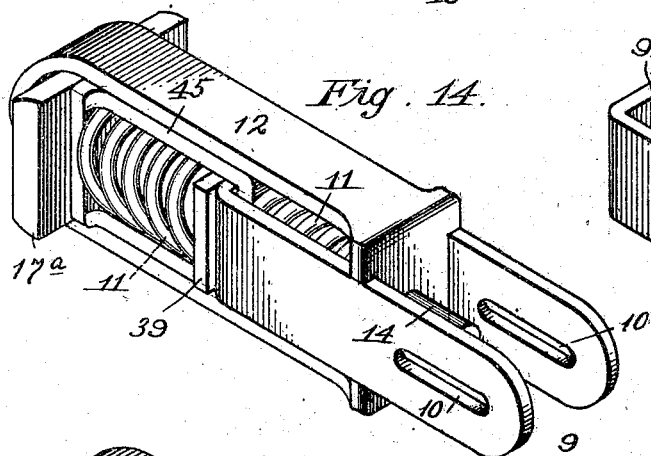
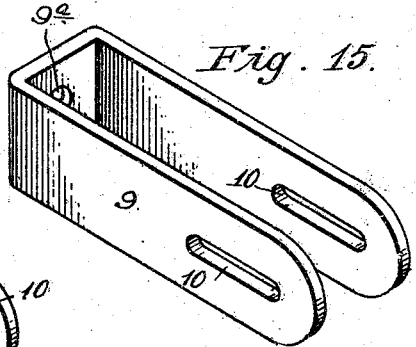
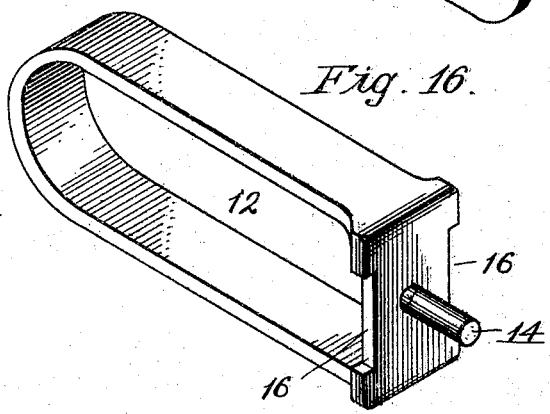
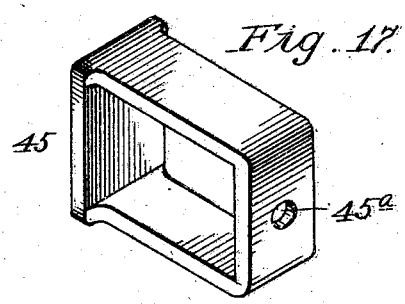
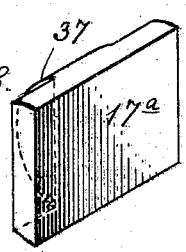
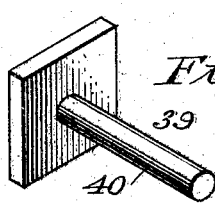
Witnesses:
A. McArthur
P. A. Hickey
Inventor:
Edward W. Hartough
By L. G. Fischer
Atty No. 785,211.

Patented March 21, 1905.

UNITED STATES PATENT OFFICE.

EDWARD W. HARTOUGH, OF THAYER, MISSOURI.

DRAFT-RIGGING.

SPECIFICATION forming part of Letters Patent No. 785,211, dated March 21, 1905.

Application filed November 23, 1903. Serial No. 182,436.

*To all whom it may concern:*

Be it known that I, EDWARD W. HARTOUGH, a citizen of the United States, residing at Thayer, in the county of Oregon and State of Missouri, have invented certain new and useful Improvements in Draft-Riggings, of which the following is a specification.

The present invention is an improvement over my patent draft-rigging for railway-cars, No. 728,227, issued May 19, 1903; and in its preferred form I dispense with follower-plates and utilize the adjacent ends of the yoke and the loop for the combined purpose of operating upon the draft-springs and assisting in securing the draw-bar and draft-rigging in proper position.

The present invention also embodies novel means for temporarily supporting the draft-timbers until repairs can be made should the bolts which normally secure the latter to the car-timbers become fractured or broken by accident.

In order that the invention may be fully understood, reference will now be made to the accompanying drawings, in which—

Figure 1:
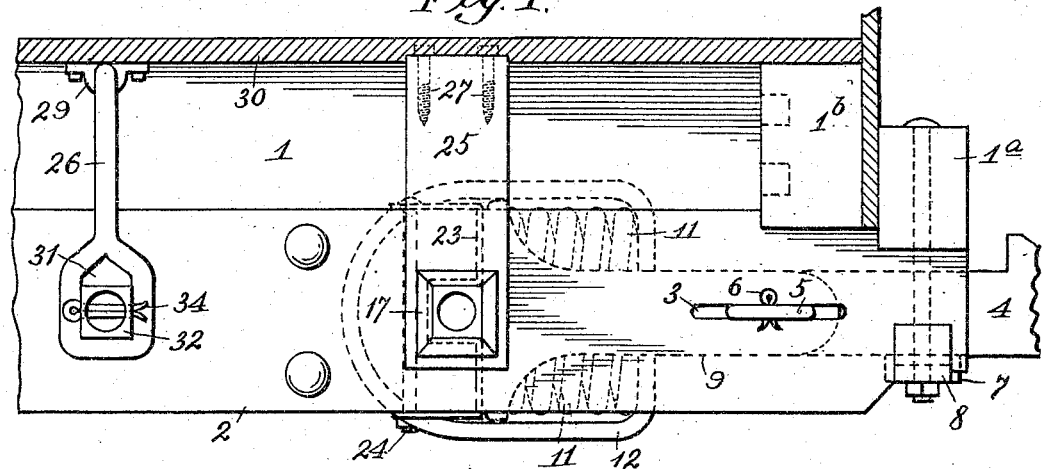
Figure 2:
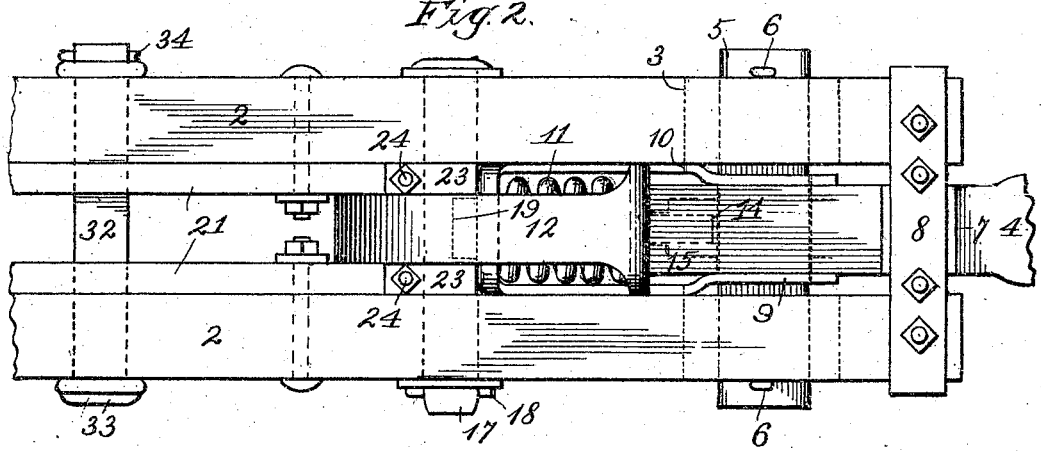
Figure 3:
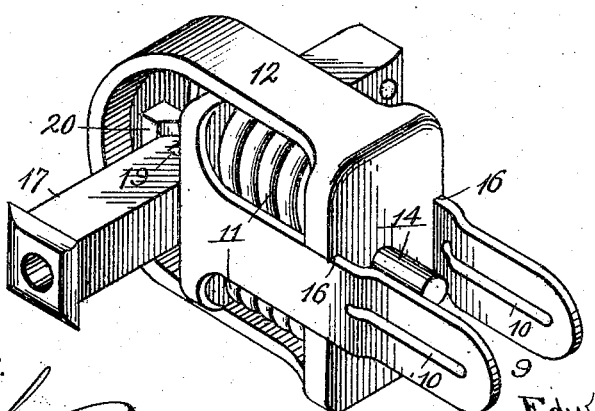
Figure 4:
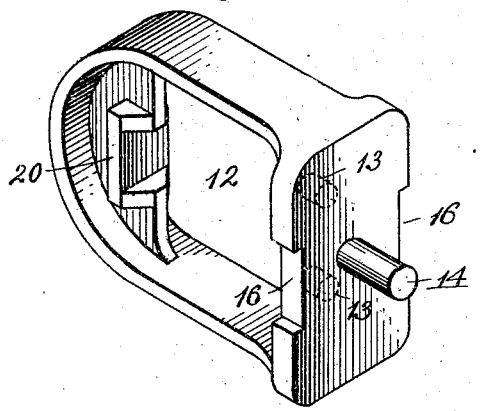
Figure 5:
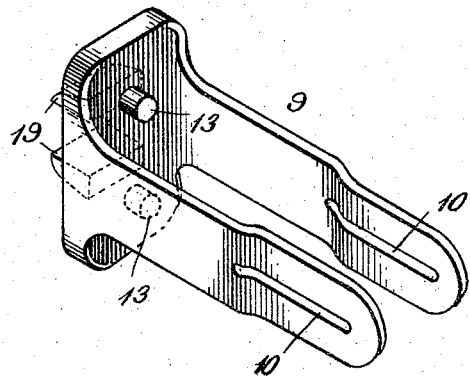
Figure 6:
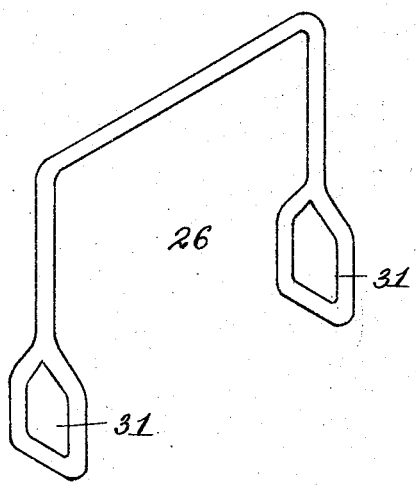
Figure 7:
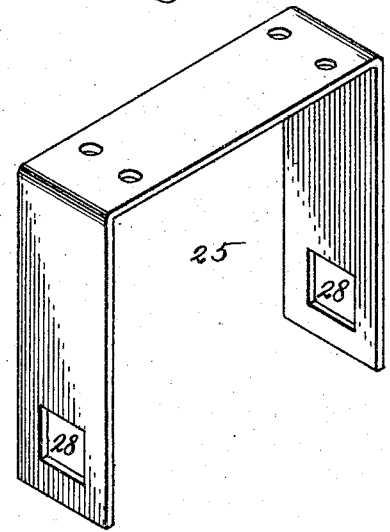
Figure 8:
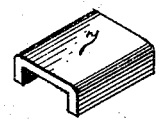
Figure 9:
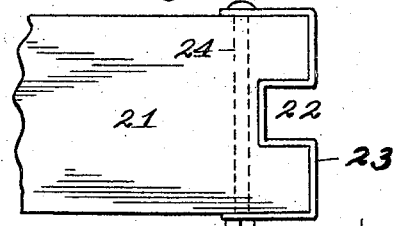

Figure 1 represents a side elevation of my preferred form of rigging with the several parts in their normal position and applied to the lower portion of a car-body. Fig. 2 is an inverted plan view of the same. Fig. 3 is a detail perspective view of the rigging detached from the draft-timbers. Fig. 4 is a detail perspective view of a loop forming part of the invention. Fig. 5 is a detail perspective view of a yoke forming part of the invention. Figs. 6 and 7 are detail perspective views of a front and rear anchor for temporarily supporting the draft-rigging and draft-timbers should the bolts securing the latter break. Fig. 8 is a detail perspective view of a chafing-plate interposed between the draw-bar and the carrying-iron. Fig. 9 is a broken side elevation of a filling-block, one of which is secured to each of the draft-timbers. Fig. 10 is an inverted plan view of a modified form in which a back-stop is substituted for the hollow key in securing the rear portion of the rigging to the draft-timbers and in which the draft-springs are arranged tandem fashion, said view showing the several parts in their normal position. Fig. 11 is a vertical longitudinal sectional view taken on line XI XI of Fig. 10 and showing the arrangement of the several parts when under compressive force. Fig. 12 is a detail perspective view of the back-stop, loop, and yoke forming part of this modification. Fig. 13 is a vertical longitudinal section of a modified form with the draft-springs in tandem and wherein an auxiliary loop is employed to compress both springs under tractive force, as shown in said figure. Fig. 14 is a detail perspective view showing several of the parts in their normal position. Fig. 15 is a detail perspective view of the yoke. Fig. 16 is a detail perspective view of the main loop. Fig. 17 is a detail perspective view of the auxiliary loop. Fig. 18 is a detail perspective view of the back-stop. Fig. 19 is a detail perspective view of a plunger which assists in compressing the rear spring.

In my present invention the draw-heads located at opposite ends of the car act independently of each other under both tractive and compressive force, and the rigging is so arranged that all the springs employed will be acted upon by either the tractive or compressive strain when the car is coupled at both ends.

1 designates the draft-sills, and 2 the draft-timbers, which are bolted to the sills in the usual manner and provided with slots 3 near their forward ends.

4 designates the draw-head located between the draft-timbers, to which its rear end is operatively secured by a closely-fitting draft-key 5, slidingly held in slots 3 by cotter-pins 6 or a pin and an integral head, the forward portion of the draw-head being slidingly supported by a chafing-plate 7, resting upon a carrying-iron 8, secured to the forward bottom portion of the draft-timbers.

9 designates a yoke having slots 10 in its forward terminals for engaging the draft-key. Said slots are longer than the width of the draft-key, and their forward ends rest against the forward ends of said key, so the yoke will be drawn outwardly therewith under tractive force. The forward ends of the yoke rest on each side of the draw-head, while its rear end contacts with the rear ends of twin draft-springs 11, arranged one above the other and contacting at their forward ends with a loop 12, encircling the draft-springs, the rear end of the yoke, and a hollow key, hereinafter described. The inner surface of the rear portion of the yoke and the inner surface of the forward portion of the loop have a plurality of lugs 13 for retaining the draft-springs in position, and as the latter are always under more or less compressive force they have little or no tendency to get out of position.

Loop 12 and the draw-head are held in alinement by a round lug 14, extending from the forward end of the loop into an aperture 15 in the rear end of the draw-head. The yoke and the loop are held in alinement by notches 16 in the front portion of the latter, which engage the opposite sides of the former, and by the rear portion of the yoke engaging the upper and lower portion of the loop.

The rear end of the draft-rigging is supported by a transverse hollow key 17, above referred to, extending through the draft-timbers and the adjacent rear ends of the yoke and the loop, said key being secured in position by its head and a cotter-pin 18. The rear ends of the yoke and loop are provided with integral guides 19 20, respectively, which slidingly engage the upper and the lower surface of the hollow key, and thus support said ends of the yoke and loop when the latter are operated by the draw-head. In addition to supporting the rear end of the rigging the hollow key also prevents the yoke from moving backwardly with the draw-head under compressive force and is assisted in resisting said force by filling-blocks 21, bolted to the inner sides of the draft-timbers and provided at their forward ends with notches 22 for the reception of the hollow key. The forward notched ends of the filling-blocks abut against the rear end of the yoke and are reinforced with metallic straps 23, secured thereto by bolts 24.

In addition to draft-timbers 2 being securely bolted to the draft-sills 1 in the usual manner they are further secured thereto by depending U-shape anchors 25 26, respectively, the former of which is secured at its upper portion to the top of the draft-sills with lag-screws 27 and at its lower ends to the hollow key, which extends through openings 28 in said lower ends. The upper portion of anchor 26 is pivotally mounted in the upper portion of the draft-sills 1 and bearings 29, secured to the car-decking 30, while the lower looped ends 31 of said anchor embrace a hollow transverse pin 32, which extends through said looped ends and the draft-timbers 2 and is removably held in position by an integral head 33 and a cotter-pin 34. Should the bolts which secure the draft-timbers to the draft-sills become broken, the rigging would be supported by the anchors until the bolts were replaced, and thus avoid an accident caused by the rigging falling upon the track.

With the above construction the usual follower-plates are dispensed with, as the rear end of the yoke will contact with and compress the draft-springs against the forward end of the loop when said yoke is drawn outwardly with the draw-head under tractive force. Under compressive force the yoke is held stationary by its rear end abutting against the hollow key and the filling-blocks, while draft-key 5 moves backwardly in slots 10 with the draw-head. Under tractive force loop 12 is held stationary by hollow key 17; but under compressive force it is moved backwardly, compressing the draft-springs between its forward end and the rear end of the yoke, which latter is held stationary by abutting against the hollow key and the filling-blocks, as above described.

This rigging can be easily removed from the draft-timbers for repairs by simply withdrawing draft-key 5 and the hollow key 17.

Figs. 10 to 12, inclusive, show a modified form of rigging in which the draft-springs are arranged tandem fashion, and a back-stop 17$^a$, arranged with its opposite ends in recesses 35 in the draft-timbers, is substituted for hollow key 17. Said back-stop is held in position by a transverse bolt 36 and has rearwardly-projecting rib 37, which is rounded to snugly fit the rear curved end of loop 12. In this construction the yoke and the loop are made longer to admit placing one of the draft-springs in the rear of the other, and the loop which encircles the back-stop, rear end of the yoke, and the draft-springs is provided with a partition 12$^a$ for compressing the rear draft-spring against the rear end of the yoke under compressive force, Fig. 11. As partition 12$^a$ is too narrow to afford sufficient bearing-surface for the rear draft-spring, a follower-plate 38 is interposed between said partition and spring and is constantly held in contact with the partition by the expansive power of the spring. Under tractive force the loop is held stationary by the back-stop, while the yoke moves forward with the draw-bar and compresses the rear draft-spring against follower-plate 38. The forward draft-spring is simultaneously compressed with the rear spring under tractive strain and compressive force between the forward end of the loop and the head of a plunger 39, slidingly arranged in the loop and provided with a stem 40, which extends rearwardly through central apertures 41 42 in the partition and follower-plate and abuts against the rear end of the yoke, with which it is constantly held in contact by the expansive power of the forward draft-spring. In this construction the draft-key does not extend through the draft-timbers, and consequently the strength of the latter is not impaired by slots 3, only one timber being cut out slightly at 43 to admit one end of the draft-key. In this construction anchor 25 is made shorter and moved forward on the draft-sills, so apertures 28 will receive the hollow key or carrying-iron 8. In this construction the anchor is bolted to the under side of dead-wood 1ª, which in turn is securely bolted to end sill 1ᵇ, so that should the draft-sill bolts break the yoke will be supported by the dead-wood, and thus sustain the front end of the draft-sills and the rigging. The rear anchor 26 is arranged in a horizontal position, with its looped ends embracing hollow pin 32 and its forward end resting in a recess 37ª in the rear portion of the back-stop. The hollow pin in this form rests against the rear side of a transom 44, so anchor 26 will be firmly secured and assist the stop-block in holding the rigging under tractive force.

In the modified form disclosed by Figs. 13 to 19, inclusive, loop 12, like the one disclosed in Figs. 10, 11, and 12, encircles the back-stop, the rear end of the yoke, and the tandem draft-springs; but partition 12ª and the follower-plates are dispensed with and an auxiliary loop 45 substituted, which slidingly operate in the main loop 12, its opposite ends engaging the rear end of yoke 9 and the back end of the rear draft-spring 11. Plunger 39 is also reversed in this construction, so its head will bear against the front end of the rear draft-spring, while its stem extends forwardly through aperture 9ª in the rear end of the yoke and an aperture 45ª in the forward end of the auxiliary loop and abuts against the forward end of the main loop 12. Under tractive force the auxiliary loop is drawn forward with the yoke and compresses the draft-springs between the head of the plunger and the forward end of loop 12, which latter is held stationary by back-stop 17ª. Under compressive force loop 12 and the plunger are pushed backwardly and compress the draft-springs against the forward and rear ends of the auxiliary loop, which is held stationary by the yoke and the back-stop.

From the above description it is apparent that I have produced a draft-rigging which is comparatively simple in construction and operation, which may be readily attached or detached from the car, and is thoroughly reliable for the purpose intended.

Having thus described my invention, what I claim, and desire to secure by Letters Patent, is—

1. In a draft-rigging for cars, the combination with the draw-head and draft-springs, of a yoke encircling one end of the draft-springs and provided at its forward ends with slots through which a key passes that secures it to the draw-head, a member secured to the car, and a loop passing around the opposite ends of the draft-springs and the member secured to the car and provided with notches in one end which engage the sides of the yoke.

2. In a draft-rigging for cars the combination with the draw-head and draft-springs, of a yoke encircling one end of the draft-springs and suitably secured to the draw-head, a member secured to the car, a loop encircling said member and the opposite ends of the draft-springs, and a guide on the loop which slidingly engages the member secured to the car.

3. In a draft-rigging for cars, the combination with the draw-head and draft-springs, of a yoke encircling one end of the draft-springs and suitably secured to the draw-head, filling-blocks secured to the car and against which one end of the yoke abuts, a member secured to the car, and a loop encircling said member and the opposite ends of the draft-springs.

4. In a draft-rigging for cars, the combination with the draw-head and draft-springs, of a yoke encircling one end of the draft-springs and suitably secured to the draw-head, a member secured to the car, a loop encircling said member and the opposite ends of the draft-springs, and guides on one end of the yoke which slidingly engage the member secured to the car.

5. In a draft-rigging for cars, the combination with the draw-head and the tandem draft-springs, of a yoke encircling one end of one of said draft-springs and suitably secured to the draw-head, a back-stop secured to the car, a loop passing around the draft-springs and back-stop, a partition in the loop, and a plunger operatively connected to the loop and partition and which bears against the end of one of the draft-springs.

6. In a draft-rigging for cars, the combination with the draw-head and the tandem draft-springs, of a yoke encircling one end of one of said draft-springs and suitably secured to the draw-head, a back-stop secured to the car, a main loop passing around the draft-springs and the back-stop, an auxiliary loop slidingly arranged in the main loop and engaging one end of each spring, and a plunger operatively arranged in the auxiliary loop and adapted to bear against one end of the springs.

7. In a draft-rigging for cars, the combination with the draw-head, draft-springs, draft-sills and draft-timbers, of a yoke encircling one end of the draft-springs and suitably secured to the draw-head, a key extending transversely through the draft-timbers, a loop encircling the key and the draft-springs, and a yoke secured to the upper surface of the draft-sills and the opposite ends of the key.

In testimony whereof I affix my signature in the presence of two witnesses.

EDWARD W. HARTOUGH.

Witnesses:
FRANK A. STICKLAND,
FRANK I. DODGE.